United States Patent

Ratteree et al.

[15] 3,691,880
[45] Sept. 19, 1972

[54] APPARATUS FOR TURNING A BRAKING SURFACE

[72] Inventors: James Ratteree, 4126 Flat Ridge Drive, Stone Mountain, Ga. 30083; James A. Seaman, 4900 Northside Drive, N.W., Atlanta, Ga. 30327

[22] Filed: Oct. 21, 1970

[21] Appl. No.: 82,624

Related U.S. Application Data

[63] Continuation-in-part of Ser. No. 40,120, May 25, 1970, abandoned.

[52] U.S. Cl. ................................................82/4 A
[51] Int. Cl. .............................................B23b 5/04
[58] Field of Search.....................................82/4, 4 A

[56] References Cited

UNITED STATES PATENTS

| 3,555,940 | 1/1971 | Cooper | 82/4 A |
| 3,540,165 | 11/1970 | Lanham | 82/4 A |
| 3,434,498 | 1/1948 | Klassett | 82/4 A |

FOREIGN PATENTS OR APPLICATIONS

| 1,374,015 | 8/1964 | France | 82/4 A |
| 1,378,424 | 10/1964 | France | 82/4 A |

*Primary Examiner*—Leonidas Vlachos
*Attorney*—B. J. Powell

[57] ABSTRACT

A method and apparatus for turning the braking surface of a vehicle lug supported braking member, such as a brake drum or disc brake, including the steps of supporting the braking member on a refinishing lathe so that its lug holes are concentric with respect to the rotational axis of the lathe, rotating the braking member, and engaging the braking surface of the member with the lathe cutting tool maintained at selected distances from the axis of rotation to redefine the braking surface concentric with respect to the circle defined by the lug holes in the braking member. The apparatus includes a backing plate adapted to be carried by a turning lathe and defining an annular groove in the working face thereof adapted to lie behind the lug holes of a braking member when placed thereon and a clamping plate also adapted to be carried by the lathe in juxtaposition with the backing plate, the clamping plate including a plurality of support pins arranged to project through the lug holes of the braking member positioned between the clamping and backing plates to position the lug holes through the member concentrically about the rotational axis of the lathe.

11 Claims, 8 Drawing Figures

INVENTORS
JAMES RATTEREE
JAMES A. SEAMAN
BY Newton, Hopkins & Ormsby
ATTORNEYS

APPARATUS FOR TURNING A BRAKING SURFACE

This application is a continuation-in-part of copending application Ser. No. 40,120, filed May 25, 1970, and now abandoned.

BACKGROUND OF THE INVENTION

During use, the braking member of a vehicle becomes worn. This causes uneven braking when the brake shoes are replaced thereby necessitating refinishing of the braking surface to re-establish a smooth braking surface when servicing the brakes of a vehicle.

In the past, the refinishing of the braking surface was accomplished by removing the braking member, placing same in a holder on an appropriate lathe, and returning the member to create a new braking surface. The prior art brake member holders for the lathe, supported the braking members by the central hole defined therethrough. This arrangement proved satisfactory for those brake members which were also supported on the vehicle by the central hole defined therethrough such as most front wheel brake members rotatably supported on the wheel spindle.

However, certain brake members are not supported on the vehicle by the central hole through the member but rather by the lugs on a spider carried by the wheel assembly such as most rear wheel brake members. Since the brake member is not supported by the central hole, this hole is many times not concentric with the braking surface and causes the braking surface, when using the prior art holders, to be returned so that it is "out-of-round" or not concentric with the rotational axis of the braking member when mounted on the vehicle.

SUMMARY OF THE INVENTION

These and other problems and disadvantages associated with the prior art techniques for refinishing the braking surfaces of brake members supported on the vehicle through the lug holes rather than the central hole are overcome by the invention disclosed herein by providing a support or lathe holder for the brake member which locates the lug hole circle concentrically with the rotational axis of the lathe. Since the lug hole circle on this type of brake member is always concentric with respect to the braking surface, the braking surface is refinished concentrically with the rotational axis of the brake member while on the vehicle.

It is therefore one of the primary objects of the invention to provide a technique for refinishing the braking surface of lug hole supported braking members concentric with the effective rotational axis of the member when mounted on the vehicle.

Another object of the invention is to provide a means for positioning a lug hole supported braking member in a refinishing lathe so that the lug hole circle is concentric with the rotational axis of the lathe.

A further object of the invention is to provide a means for positioning a lug hole supported braking member in a refinishing lathe which is adjustable to different size brake members.

An additional object of the invention is to provide a means for positioning a lug hole supported braking member in a refinishing lathe which is automatically adjustable for different size lug holes through the brake member.

A still further object of the invention is to provide a lathe adapter for lug hole supported braking members which is simple in construction, economical to manufacture, and reliable in operation.

The method of the invention includes the steps of positioning a lug supported braking member in a refinishing lathe so that the circle defined by its lug holes is concentric with respect to the rotational axis of the lathe; rotating the braking member about the axis on the lathe; engaging the braking surface of the member with the lathe supported cutting tool positioned at predetermined distances from the lathe axis to redefine a new braking surface concentric with the circle defined by the lug holes. Since the effective rotational axis of the braking member when mounted on the vehicle coincides with the center of the circle defined by the lug holes through the braking member, the braking surface is also concentric about the effective rotational axis.

The apparatus of the invention includes an adapter assembly which mounts the braking member on the lathe so that the lug hole circle is concentric about the rotational axis of the lathe. The adapter assembly includes a backing plate mounted on the drive spindle of a refinishing lathe and an alignment plate removably mounted on the drive spindle so that the braking member can be clamped between the two plates. The alignment plate has a series of positioning pins extending therefrom toward the backing plate which extend through the lug holes in the braking member to position the lug hole circle concentrically about the rotational axis of the drive spindle. The positioning pins may be adjustably located in the alignment plate to compensate for different size lug hole circles or may be tapered and spring urged into the lug holes to compensate for different lug hole diameters.

These and other features, objects and advantages of the present invention will become apparent upon consideration of the following specification and accompanying drawings wherein like characters of reference designate corresponding parts throughout the several views and wherein:

These figures and the following detailed description of the invention disclose specific embodiments of a support adapter, however, it is to be understood that the inventive concept is not limited thereto since it may be embodied in other forms.

Figure 1:
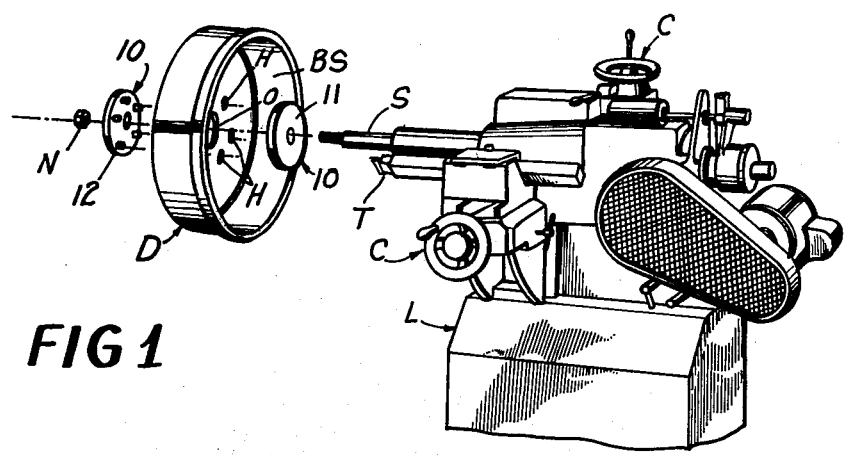
FIG. 1 is an exploded partial perspective view of a refinishing lathe with one embodiment of the invention.
Figure 2:
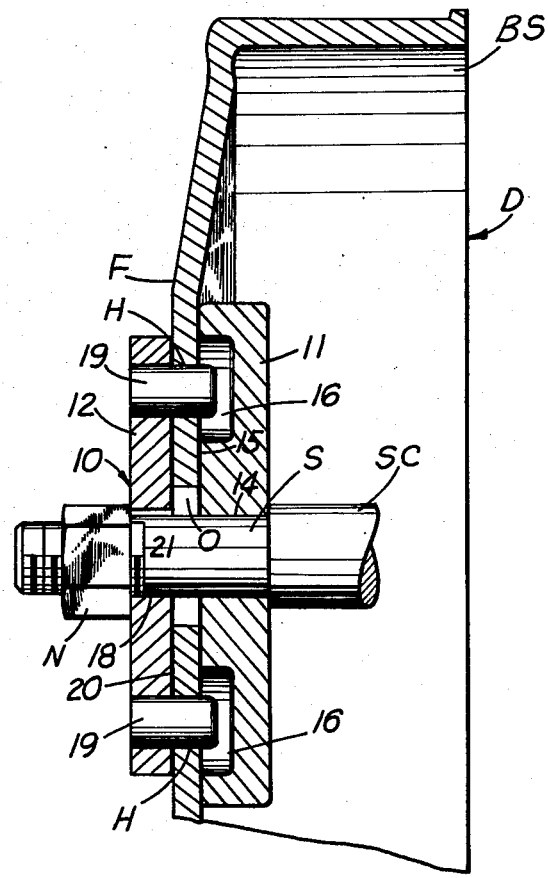
FIG. 2 is a cross-sectional view of the adapter of FIG. 1 with a braking member supported thereby.

Further, the illustrative embodiment described herein below and illustrated in FIGS. 1 and 2 is directed to a brake drum, however, it is to be understood that a disc braking member having lug holes may be used in combination with the support adapter without departing from the spirit of the invention.

DETAILED DESCRIPTION OF ILLUSTRATIVE EMBODIMENTS

Referring to FIG. 1, it will be seen that the apparatus of the invention is mounted on a refinishing or turning lathe L. The lathe L includes a drive spindle S for rotatably driving the workpiece and a cutting tool T for engaging the workpiece. Appropriate controls C are provided for controlling the speed of spindle S and the movement of Tool T in conventional manner. A nut N threadedly engages the free end of spindle S hold adapters thereon.

The brake drum D to be refinished is shown as a conventional rear brake drum which is attached to the rear wheel assembly (not shown) by the lug bolts of the rear axle arbor or spider. When the drum D is placed on these lug bolts with the tire rim also placed thereon outside of and in juxtaposition with the drum D, and the lugs threaded onto the lug bolts and tightened, the drum D will be held in position. The drum D defines an annular braking surface BS around the inside thereof as best seen in FIG. 2. A central relief opening O is provided through the center of the face F of the drum and is surrounded by a plurality of lug bolt receiving holes H. The holes H are circumferentially spaced about a lug circle having a center coinciding with the effective rotational axis of the wheel assembly when the drum D is installed on a vehicle. Since the lug bolts support the drum D, the surface BS must be concentric with the lug circle, not the central opening O, since it does not support the drum. Therefore, when the surface BS is refinished, it must remain concentric with the lug circle in order to insure proper braking contact between the surface BS and the associated brake shoes, not shown.

Referring more particularly to FIGS. 1 and 2, the adapter 10 comprises generally a backing plate 11 and an alignment plate 12. The drum D is clamped between these two plates for refinishing. The backing plate 11 is disc shaped and defines a central passage 14 therethrough dimensioned to slidably receive the spindle S so that the working face 15 of the plate is perpendicular to the axis of spindle S. It will also be noted that spindle S is provided with a stop collar SC to limit movement of the plate 11 along spindle S. An annular recess 16 is defined in face 15 which is concentric about passage 14 and dimensioned so as to lie behind the lug bolt receiving holes H of the drum D. Since the lug circle may vary in diameter slightly from vehicle to vehicle, the width of recess 16 is sufficient to span these holes H of the different drums.

The alignment plate 12 is adapted to slidably fit about spindle S outside drum D so that, when nut N is threaded onto spindle S behind plate 12, the drum D and adapter 10 will be locked in position on spindle S. Plate 12 is also disc shaped and defines a spindle aperture 18 centrally therethrough adapted to slidably receive spindle S. A plurality of positioning pins 19 are mounted in the bearing face 20 of plate 12 and extend outwardly therefrom toward the plate 11. The pins 19 are sized to correspond to the lug bolts (not shown) received through holes H and are circumferentially spaced about a circle corresponding to the lug circle of holes H. Pins 19 extend through holes H and into recess 16 to position the lug circle of drum D and thus braking surface BS concentrically about the axis of spindle S.

When nut N is in position as shown in FIG. 2, the drum D is clamped in position and the lathe controls C are manipulated to turn drum D. The plate 12 may be keyed to spindle S with key 21 as shown in FIG. 2 to insure driving engagement between spindle S and plate 12 along with drum D.

Figure 3:
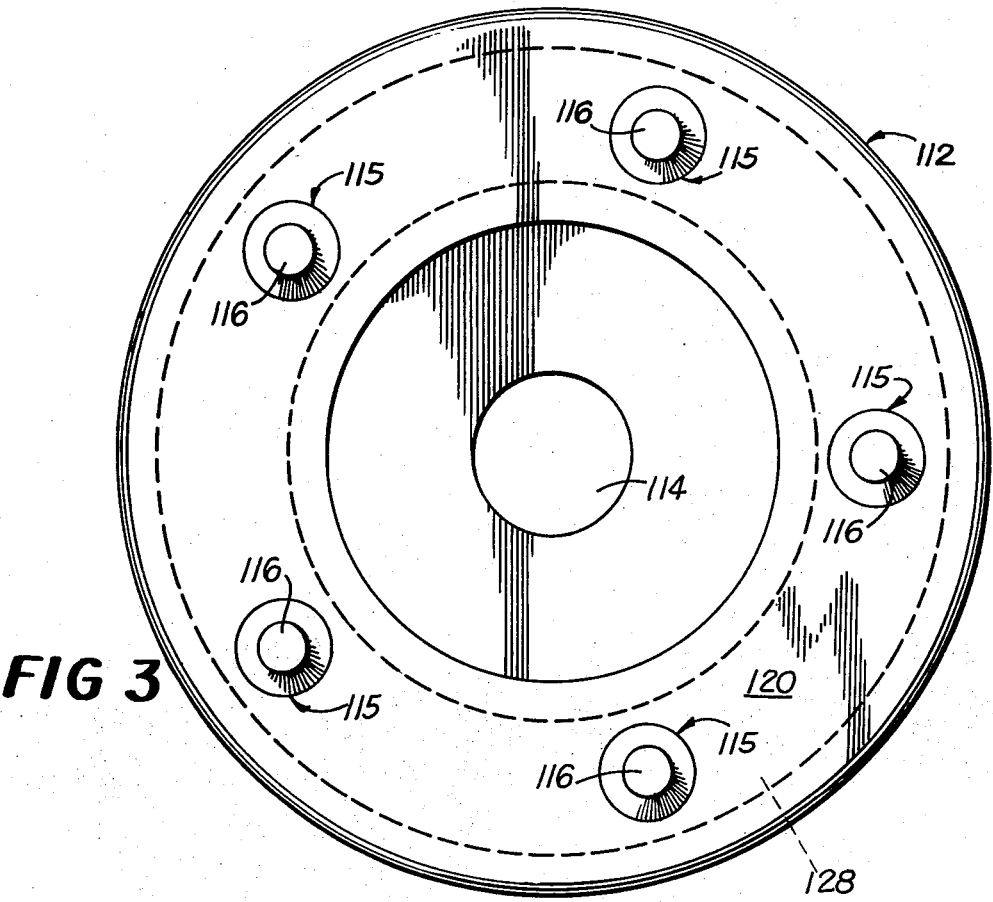
FIG. 3 is a front elevational view of a second embodiment of the alignment plate of the adapter.
Figure 4:
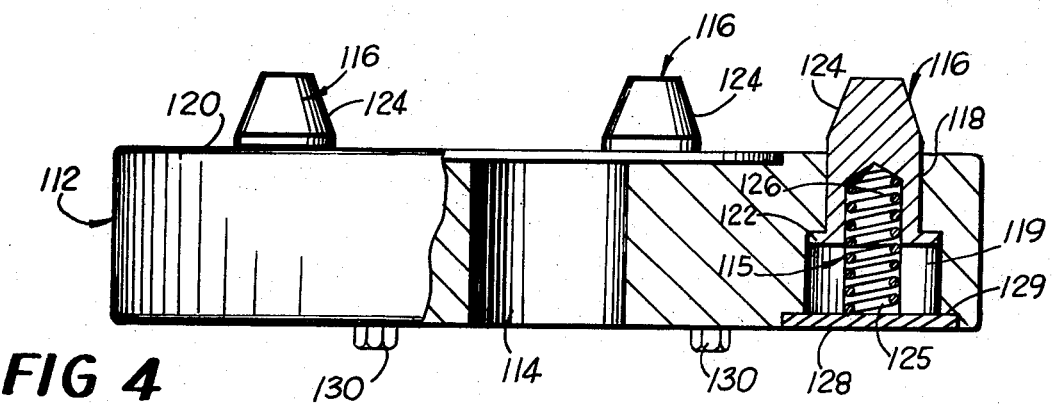
FIG. 4 is a side view of the alignment plate of FIG. 3 partially broken away to show the internal construction thereof.

Referring now to FIGS. 3 and 4, a second embodiment of the alignment plate is shown and referenced by the numeral 112. The plate 112 is disc shaped and defines a central spindle aperture 114 therethrough which slidably receives the spindle S. Circumferentially spaced about a circle corresponding to the lug circle and concentrically about the aperture 114 are a plurality of positioning assemblies 115 that engage and support drum D by its lug bolt receiving holes H.

Each assembly 115 as best seen in FIG. 4 includes a pin 116 slidably received in a bore 118 in plate 112 extending therethrough parallel to and spaced outwardly of aperture 114. Bore 118 is provided with a counterbore 119 extending into plate 112 opposite the bearing face 120 thereof. Pin 116 as a body 121 with a diameter such that it is slidably received through bore 118 and an arresting flange 122 therearound at the rear end thereof of a diameter larger than bore 118 but slidably receivable in counterbore 119. That end of pin 116 protruding from face 120 is tapered at 124 and a coil spring 125 received in recess 126 in pin 116 serves to urge pin 116 to extend from face 120.

Each spring 125 is held in position in plate 112 by an annular retainer 128 which covers the open ends of counterbores 119. An appropriate annular depression 129 is provided in the back side of plate 112 to receive retainer 128. Appropriate fasteners 130 maintain retainer 128 in place.

In operation, plate 112 is used with backing plate 11 in a manner similar to plate 12. The springs 125 cause the tapered portion 124 to project outwardly of the face 120. As portions 124 of pins 116 extend into holes H in the drum D, the pins 116 will, under the influence of springs 125, cause the drum to be centered about spindle S as nut N is tightened to clamp drum D between the faces 15 and 120 of plates 11 and 112. The tapered portions 124 compensate for different size holes H in drum D. While various sizes of portions 124 may be used, it has been found that a portion 124 that is three-eights inch at its small end and three-fourths inch at its large end will handle most passenger car brake drums.

Figure 5:
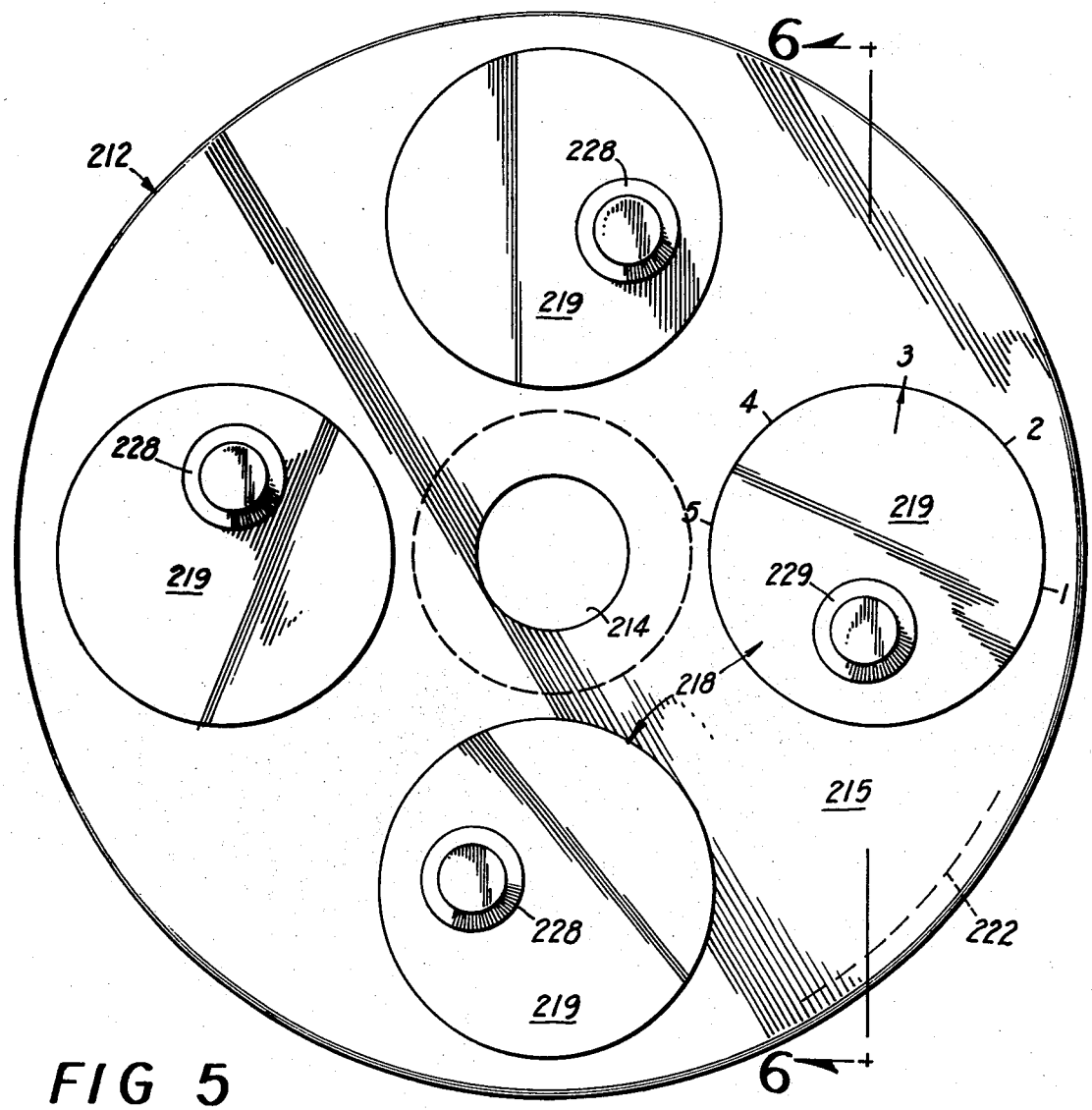
FIG. 5 is a front elevational view of a third embodiment of the alignment plate of the invention.
Figure 6:
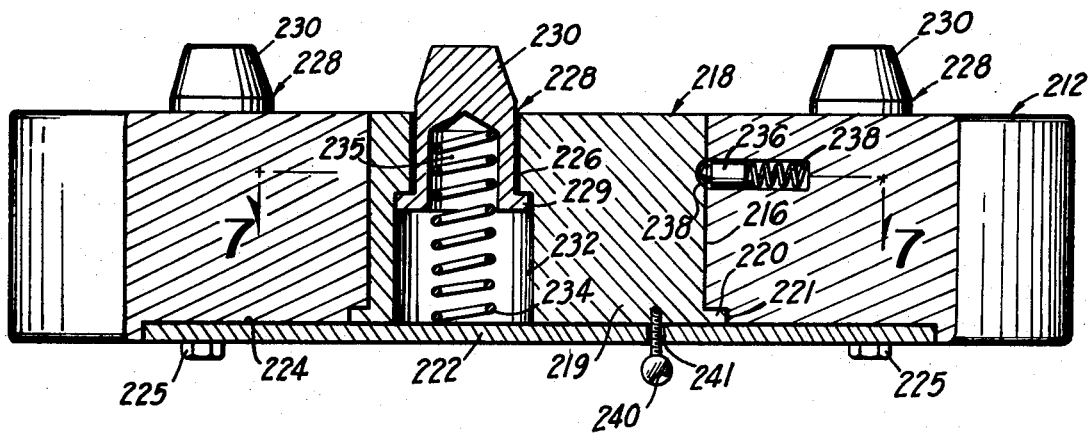
FIG. 6 is a partial cross-sectional view of the alignment plate taken along line 6—6 in FIG. 5.

Referring to FIGS. 5 and 6, a third embodiment of the alignment plate is shown and designated 212. Plate 212 is used in the same manner as plates 12 and 112 with plate 11 to support a brake drum D.

Plate 212 is disc shaped and defines a central spindle aperture 214 therethrough which slidably receives spindle S. Plate 212 defines a bearing face 215 on one side thereof and a plurality of bores 216 therethrough circumferentially spaced about a circle corresponding to the average or median lug circle of most brake drums. These bores 216 are parallel to aperture 214 and each rotatably receives therein a positioning assembly 218.

Each positioning assembly 218 includes a bushing 219 rotatably received in bore 216 with a retaining flange 220 connected to the rear end of bushing 219. A counterbore 221 is provided around bore 216 on that side of plate 212 opposite face 215 to rotatably receive flange 220. An annular retainer 222 is received in annular depression 224 in plate 212 to retain bushing 219 in position and is held therein by fasteners 225 similar to retainer 128 in plate 112.

Bushing 219 has a bore 226 therethrough which is offset radially from the center of bushing 219, that shown here being a one-half inch offset. Bore 226 slidably receives a positioning pin 228 therein similar in construction to pin 116 with an arresting flange 229, tapered portion 230, and body 231. A counterbore 232 is provided around bore 226 at the rear end of bushing 219 to slidably receive flange 229. A coil spring 234 similar to spring 125 is received in recess 235 in the back of pin 228 and held in position by retainer 222. Spring 234 urges tapered portion 230 of pin 228 to extend from bearing surface 215 as pin 116 extends from surface 120 of plate 112.

As bushings 219 are rotated in bores 216, it will be seen that pins 228 will be centered on different circles. Since brake drum lug hole circles vary, this plate 212 will allow one plate to be used for several different lug hole circles. While the actual dimensions may vary, most popular American automobiles have four different lug hole circles ranging from four inches to 5 inches. FIG. 5 shows indicia for five settings of bushing 219 with position 1 being four inches and positions 2–5 varying up to 5 inches over one-fourth inch increments.

Figure 7:
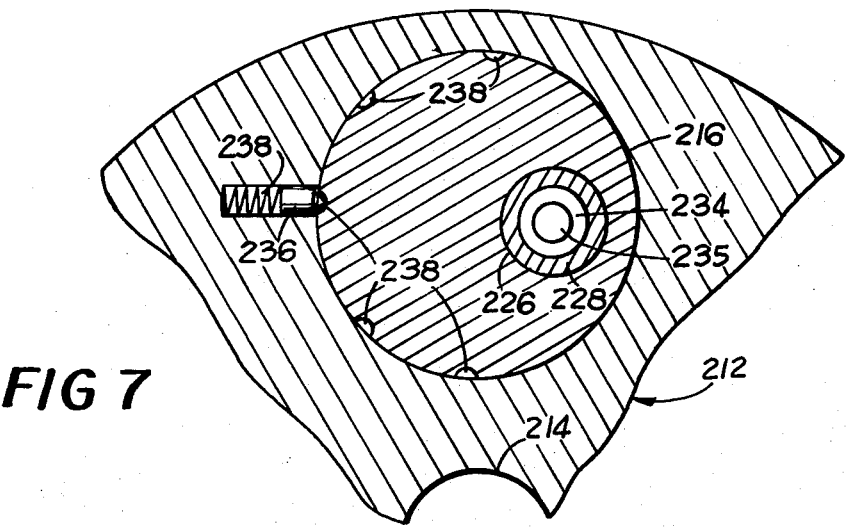
FIG. 7 is a cross-sectional view taken along line 7—7 in FIG. 6.
Figure 8:
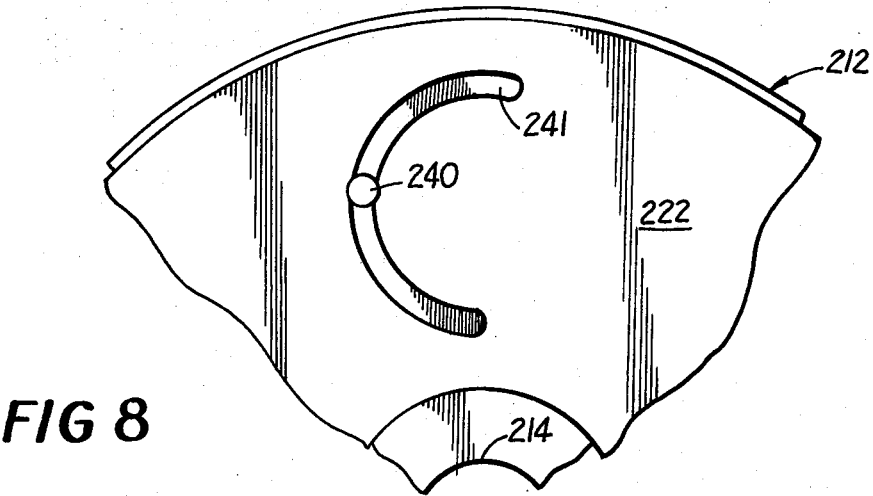
FIG. 8 is a partial rear view of the alignment plate showing the drive handle.

To maintain bushings 219 in their selected rotational positions, a detent 236 is provided in plate 212 with appropriately positioned detent recesses 238 in bushing 219 about bore 216. Each detent 236 is urged toward recesses 238 by spring 239 as best seen in FIG. 7. A drive handle 240 is provided on the rear end of each bushing 219 and extends through arcuate slot 241 in retainer 222 as best seen in FIG. 8 to rotate each bushing 219.

In using the plate 212 with backing plate 11, the handles 240 are moved to rotate pins 228 to lie along the appropriate lug hole circle and the plate 212 placed in position by drum D as explained for plate 112. The tapered portions 230 of pins 228 center the drum D as with plate 112 when the nut N is tightened to cause bearing surface 215 to contact the outside of drum D and clamp same between plates 11 and 212. Then the drum D can be returned in conventional manner.

While specific embodiments of the invention have been disclosed herein, it is to be understood that full use of modifications, substitutions and equivalents may be used without departing from the scope of the inventive concept.

What is claimed is:

1. An adapter support means for use in supporting a braking member for rotation on the drive spindle of a turning lathe, wherein said braking member includes a series of lug receiving holes arranged in an angularly spaced circular relationship about the effective axis of rotation of said member braking surface comprising in combination, a backing plate and an alignment plate detailed in design to be positioned on said drive spindle and on opposite sides of the braking member for clamping the braking member therebetween, said alignment plate including a series of axially projecting pins detailed in design to engage and extend through said braking member lug bolt receiving holes and said backing plate defining an annular recess detailed in design to receive said pins extending through said lug bolt receiving holes to support said member therebetween for rotation about an axis established by said member lug receiving holes, said alignment plate and said backing plate having means for supporting said adapter and said engaged braking member on said lathe for rotation of said braking member about said effective rotational axis.

2. An adapter support means as described in claim 1 further characterized in that said alignment plate defines an aperture therethrough concentric to said axis established by said lug receiving openings for slidably receiving said drive spindle of said lathe.

3. An adapter support means for use in supporting a braking member for rotation on the drive spindle of a turning lathe, wherein said braking member includes a series of lug receiving holes arranged in an angularly spaced circular relationship about the effective axis of rotation of said member braking surface comprising, in combination, first means for engaging said lug receiving holes for establishing the rotational axis of said braking member; and second means for supporting said adapter and said engaged braking member on said lathe for rotation about said rotational axis by said lug receiving holes, said first means including an alignment plate and a plurality of support pins slidably carried by said alignment plate, each of said pins including tapered brake member engaging ends and concentrically spaced about the drive spindle of the lathe when said plate is positioned thereon and in alignment with said lug bolt receiving holes; and resilient means for yieldably urging said pins to extend from said plate.

4. The adapter of claim 3 further including a plurality of boss members rotatably carried by said alignment plate and circumferentially spaced about a circle concentric with the lathe drive spindle and corresponding to the mean diameter circle of the lug bolt receiving holes in said brake member each of said boss members slidably carrying one of said support pins and its said associated resilient means along an axis displaced from the rotational axis of said boss member so that rotation of said boss members serves to change the effective diameter of the circle along which said support pins lie.

5. An adapter support means for use in supporting a brake drum for rotation on the drive spindle of a turning lathe, wherein said brake drum includes a series of lug receiving holes arranged in an angularly spaced circular relationship about the effective axis of rotation of said brake drum braking surface comprising in combination, a backing plate and an alignment plate detailed in design to be positioned on said drive spindle and on opposite site sides of the brake drum for clamping the brake drum therebetween, said alignment plate including a series of axially projecting pins detailed in design to engage and extend through said brake drum lug bolt receiving holes and said backing plate defining an annular recess detailed in design to receive said pins extending through said lug bolt receiving holes to support said brake drum therebetween for rotation about an axis established by said brake drum lug receiving holes, said alignment plate and said backing plate having means for supporting said adapter and said engaged brake drum on said lathe for rotation of said brake drum about said effective rotational axis.

6. An adapter support means as described in claim 5 further characterized in that said alignment plate defines an aperture therethrough concentric to said axis established by said lug receiving openings for slidably receiving said drive spindle of said lathe.

7. An adapter support means for use in supporting a brake drum for rotation on the drive spindle of turning lathe, wherein said brake drum includes a series of lug receiving holes arranged in an angularly spaced circular relationship about the effective axis of rotation of said brake drum braking surface comprising, in combination, first means for engaging said lug receiving holes for establishing the rotational axis of said brake drum; and second means for supporting said adapter and said engaged brake drum on said lathe for rotation about said rotational axis by said lug receiving holes, said first means including an alignment plate and a plurality of support pins slidably carried by said alignment plate, each of said pins including tapered brake drum engaging ends and concentrically spaced about the drive spindle of the lathe when said plate is positioned thereon and in alignment with said lug bolt receiving holes, and resilient means for yieldably urging said pins to extend from said plate.

8. The adapter of claim 7 further including a plurality of boss members rotatably carried by said alignment plate and circumferentially spaced about a circle concentric with the lathe drive spindle and corresponding to the mean diameter circle of the lug bolt receiving holes in said brake member, each of said boss members slidably carrying one of said support pins and its said associated resilient means along an axis displaced from the rotational axis of said boss member so that rotation of said boss members serves to change the effective diameter of the circle along which support pins lie.

9. An adapter for supporting a circular vehicle braking member defining an annular braking surface therearound and a plurality of lug receiving holes therethrough arranged in an angularly spaced relationship about a lug hole circle concentric with the effective axis of rotation of said annular braking surface on the drive spindle of a turning lathe including:
an alignment plate defining a central aperture therethrough slidably receivable on said drive spindle; and,
a plurality of axially projecting pins mounted on said plate and projecting from one surface of said alignment plate equally spaced about a circular path concentric with said central aperture, said path corresponding in diameter to the diameter of said lug hole circle and said pins corresponding in number and spacing to said lug receiving holes through said braking member, each of said pins defining a tapered surface on the projecting end thereof and detailed in design to engage and extend through one of said lug receiving holes so that when said pins extend through said lug receiving holes and said alignment plate is mounted on said drive spindle through said central aperture, said braking member is supported on said lathe so that said effective axis of rotation of said annular braking surface coincides with the rotational axis of rotation of said drive spindle, wherein each of said pins is slidably mounted in said alignment plate for movement with respect to said one surface of said alignment plate along a path parallel to the centerline of said central aperture through said alignment plate; and,
further including resilient means for yieldably urging said pins to extend from said plate.

10. The adapter of claim 9 further including a backing plate defining a central mounting aperture therethrough slidably receivable on said drive spindle on the side of said braking member opposite said alignment plate to clamp said braking member between said backing plate and said alignment plate.

11. The adapter of claim 10 further including retaining means for limiting the amount of extension of the projecting ends of said pins from said alignment plate under the influence of said resilient means.

* * * * *